United States Patent Office 2,825,657
Patented Mar. 4, 1958

---

2,825,657

PRINTING INK VEHICLE

Walter W. Mock, Rutherford, N. J., and Richard H. Bidle, Chicago, Allen G. Corliss, St. Charles, and Harold E. Phifer, Riverside, Ill., assignors to Interchemical Corporation, New York, N. Y., a corporation of Ohio No Drawing. Application June 18, 1954
Serial No. 437,892

3 Claims. (Cl. 106—239)

This invention relates to varnishes which are particularly adapted for use as vehicles for printing inks; more particularly the invention relates to varnishes containing zinc-calcium resinate dissolved in a suitable solvent and to inks made therefrom.

Heretofore, it has been known to prepare ink varnish vehicles which comprise zinc-calcium resinate solutions. Such varnishes can be made by the fusion method, i. e. reacting rosin with the appropriate zinc and calcium compounds in the absence of solvent and then dissolving the resulting resinate in a suitable solvent, or they can be made by a two step solvent method, i. e. by reacting rosin in solution with the appropriate zinc compound and then in a second step with the calcium compound. Neither of these methods gives a varnish that is particularly desirable for use in ink varnish vehicles which include ethyl cellulose as an additional binder in the varnish vehicle. Such resinates, when dissolved in low solvency hydrocarbon solvents such as lactol spirits do not have the ability to hold ethyl cellulose in solution.

We have now discovered an improved process for making zinc-calcium resinate varnishes, using low solvency hydrocarbon solvents, that are compatible with ethyl cellulose and hold the ethyl cellulose in solution.

In accordance with the method of our invention we react calcium hydroxide and zinc oxide with rosin dissolved in a low solvency hydrocarbon solvent in a one reaction step. The reaction is carried out under autogenous pressure by heating the reaction mixture in an enclosed vessel to the desired reaction temperature, heating being continued until all of the calcium and zinc compounds have combined with the rosin. The reaction temperature may vary over rather wide limits, however, we prefer temperatures on the order of 250° to 400° F. The time for complete reaction will of course, be less, the higher the reaction temperature is maintained.

Preferably the reaction is carried out in the presence of conventional catalyst, such as low molecular weight aliphatic monocarboxylic acid. Acetic acid is a typical and preferred catalyst.

Other conventional additives are advantageously included in the reaction mixture. For instance aldehydes, such as a small amount of formaldehyde, tends to prevent crystallization of the resinate.

The following ratios are preferred ratios of reactants used in the process of the present invention:

| | Parts |
|---|---|
| Rosin | 100 |
| Low solvency solvent | 50 to 150 |
| Calcium hydroxide | 1.0 to 5.5 |
| Zinc oxide | 5.0 to 15.0 |
| Catalyst, e. g. acetic acid | to 0.5 |
| Formaldehyde (paraformaldehyde) | 3 to 4 |

Such reaction mixtures are heated under autogenous pressure until reaction is complete, then cooled and, if desired, additional solvent and ethyl cellulose are added to produce the desired ink vehicle.

The rosin used in the process can be any of the commercial grades of rosin or abietic acid, for instance, wood rosin, gum rosin, acintol R (from sulfite waste liquor) and Tallex (from sulfite waste liquor). The higher melting grades are preferred, e. g. Acintol R tall oil rosin "D," which has a melting point of 169°–190° F. (ring and ball method), an acid number of 160–170, a saponification number of 168–178, and an unsaponifiable content of 4.5 to 7%.

Typical specific examples of the invention are:

Example 1

An ink varnish was prepared from:

| | Parts |
|---|---|
| Acintol R tall oil rosin "D" | 48.92 |
| Lactol spirits (hydrocarbon solvent, boiling range 198° to 242° F., dimethyl sulfate value 16%) | 24.46 |
| Calcium hydroxide | 1.37 |
| Zinc oxide | 2.69 |
| Glacial acetic acid | 0.10 |
| Paraformaldehyde | 1.61 |

The above ingredients were mixed and heated in an enclosed vessel provided with a trap for collecting water. Heating was continued at 285° F. to 360° F. until the reaction was complete as evidenced by the rate at which water is being collected in the water trap. As water is removed the temperature increases so that by the time the reaction is complete, about three hours, the temperature is at the maximum. Although the process was carried out in such manner that the internal pressure of the system never exceeded about 55 pounds per square inch, this was due to the fact that the equipment used was not designed for higher pressure and not to a limitation on the process itself.

The reaction mixture was cooled to about 150° F. and then

| | Parts |
|---|---|
| Lactol spirits | 16 |
| Ethyl cellulose (46.8–48.5% ethoxy, 100 centipoise grade) | 2.15 |
| Ethyl alcohol | 2.70 | was added and then the mixture again heated at 240° F. until the ethyl cellulose was dissolved. The ethyl cellulose may be any of these materials containing 45.5 to 50% ethoxy, or ethyl hydroxy ethyl cellulose.

Example 2

A typical ink formulation using the above varnish, is as follows:

| | Parts by weight |
|---|---|
| Benzidine yellow | 3.00 |
| Chrome yellow | 8.00 |
| Clay | 12.00 |
| Xylol | 1.00 |
| Varnish, from Example 1 | 74.00 |
| Lactol spirits | 2.00 |

The varnish used in the above formulation is varnish containing 2.15 parts of ethyl cellulose. Although the varnish which does not contain ethyl cellulose can be used in making inks, we prefer to use ethyl cellulose to obtain the best inks.

Example 3

A red ink is prepared in accordance with the invention by suitably mixing the following ingredients:

|  | Parts |
|---|---|
| Phloxine toner | 1.25 |
| Barium lithol toner (barium salt of the dye obtained by coupling 2-naphthol with diazotized 2-amino-1-naphthalenesulfonic acid) | 7.50 |
| Clay | 5.00 |
| Xylol | 1.25 |
| Varnish from Example 1 | 85.00 |
|  | 100.00 |

Example 4

A blue ink is prepared in accordance with the invention by suitably mixing:

|  | Parts |
|---|---|
| Milori blue | 12.50 |
| Xylol | 1.00 |
| Varnish from Example 1 | 83.00 |
| Lactol spirits | 3.50 |

It will be understood that the practice of the present invention is not to be limited to the specific examples disclosed above but that various modifications may be made therein without departing from the scope of the invention as it is defined in the appended claims.

We claim:

1. The method of preparing a zinc calcium resinate varnish for use in printing inks consisting of, reacting 100 parts of rosin dissolved in 50 to 150 parts of a hydrocarbon solvent capable of holding the zinc calcium resinate and ethyl cellulose in solution, with 1.0 to 5.5 parts of calcium hydroxide and 5.0 to 15.0 parts zinc oxide, said reaction being carried out at a temperature of about 250° F. to 400° F. under autogenous pressure until all the zinc and calcium hydroxide have reacted.

2. The method of preparing a zinc calcium resinate varnish for use in printing inks consisting of, reacting 100 parts of rosin dissolved in 50 to 150 parts of a hydrocarbon solvent capable of holding the zinc calcium resinate and ethyl cellulose in solution, with 1.0 to 5.5 parts calcium hydroxide and 5.0 to 15.0 parts zinc oxide and 3 to 4 parts formaldehyde, in the presence of acetic acid as a catalyst, at a temperature of about 250° F. to 400° F. under autogenous pressure until all the zinc and calcium compounds have reacted.

3. The method of preparing a varnish for use in printing inks consisting of reacting 100 parts of a commercial grade of rosin obtained from sulfite waste liquor and having a melting point of 169–190° F. (ring and ball method), an acid number of 160–170, a saponification number of 169–178, and an unsaponifiable content of 4.5 to 7% dissolved in 50 to 150 parts of a hydrocarbon solvent having a boiling range of 198° to 242° F. and a dimethyl sulfate value of 16%, with 1.0 to 5.5 parts calcium hydroxide, 5.0 to 15.0 parts zinc oxide and 3 to 4 parts formaldehyde, in the presence of acetic acid catalyst, at a temperature about 250° to 400° F. under autogenous pressure until all the zinc and calcium compounds have reacted.

References Cited in the file of this patent

UNITED STATES PATENTS

| | | |
|---|---|---|
| 981,647 | Havens | Jan. 17, 1911 |
| 1,663,733 | Schmidinger | Mar. 27, 1928 |
| 2,332,623 | Clare | Oct. 26, 1943 |
| 2,346,992 | Palmer et al. | Apr. 18, 1944 |
| 2,572,071 | Clair et al. | Oct. 23, 1951 |

FOREIGN PATENTS

| | | |
|---|---|---|
| 612,807 | Great Britain | Nov. 18, 1948 |